United States Patent
Frueh et al.

(10) Patent No.: US 8,825,332 B2
(45) Date of Patent: Sep. 2, 2014

(54) METHOD FOR STABILIZING A VEHICLE IN A DRIVING SITUATION IN WHICH THE VEHICLE IS SIMULTANEOUSLY BRAKED AND STEERED

(75) Inventors: Philipp Frueh, Clayton (AU); Rainer Brueggemann, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 21 days.

(21) Appl. No.: 13/517,441

(22) PCT Filed: Oct. 25, 2010

(86) PCT No.: PCT/EP2010/066028
§ 371 (c)(1),
(2), (4) Date: Aug. 28, 2012

(87) PCT Pub. No.: WO2011/076461
PCT Pub. Date: Jun. 30, 2011

(65) Prior Publication Data
US 2012/0310503 A1  Dec. 6, 2012

(30) Foreign Application Priority Data
Dec. 21, 2009 (DE) .......................... 10 2009 055 035

(51) Int. Cl.
*B60T 8/24* (2006.01)
*B60T 8/60* (2006.01)

(52) U.S. Cl.
USPC ........... 701/72; 701/82; 303/146; 303/122.01

(58) Field of Classification Search
USPC .................. 701/72, 70, 82; 303/122, 122.01, 303/122.02, 146
See application file for complete search history.

(56) References Cited

U.S. PATENT DOCUMENTS

| 5,134,352 A * | 7/1992 | Matsumoto et al. ........... 318/587 |
| 2002/0030406 A1* | 3/2002 | Poggenburg et al. .......... 303/146 |
| 2005/0015192 A1* | 1/2005 | Kato et al. ...................... 701/70 |

(Continued)

FOREIGN PATENT DOCUMENTS

| CN | 101168365 | 4/2008 |
| DE | 41 12 284 | 10/1991 |
| DE | 198 20 107 | 6/1999 |
| DE | 101 50 493 | 5/2002 |
| DE | 102 23 847 | 1/2003 |

OTHER PUBLICATIONS

Matsuda, JP Patent Application No. 03-022720, Machine Translation.*

(Continued)

*Primary Examiner* — Calvin Cheung
*Assistant Examiner* — Courtney Heinle
(74) *Attorney, Agent, or Firm* — Kenyon & Kenyon LLP

(57) ABSTRACT

A method is described for stabilizing a vehicle during a braking maneuver, in which the vehicle is steered at the same time. In order to bring the vehicle back again into a controlled state as rapidly as possible, the driving state is monitored with respect to a driving situation in which the wheel slip of the front wheels is greater than a specified threshold value, and besides that, a steering requirement is present. If such a driving situation has been detected, the brake pressure is first reduced at a first front wheel and after that at a second front wheel on the other side of the vehicle, until the wheel start-up pressure is reached. Because of that, the first wheel starts up substantially faster than in response to a simultaneous pressure reduction.

9 Claims, 4 Drawing Sheets

(56) References Cited

U.S. PATENT DOCUMENTS

2005/0143892 A1*  6/2005  Batistic et al. .................. 701/82
2007/0219699 A1*  9/2007  Graf ............................... 701/72
2009/0248268 A1* 10/2009  Shigeta et al. .................. 701/72
2011/0204709 A1*  8/2011  Brueggemann et al. ... 303/113.1

OTHER PUBLICATIONS

Woywod et al., DE 19820107, Machine Translation.*

* cited by examiner

METHOD FOR STABILIZING A VEHICLE IN A DRIVING SITUATION IN WHICH THE VEHICLE IS SIMULTANEOUSLY BRAKED AND STEERED

FIELD OF THE INVENTION

The present invention relates to a method for stabilizing a vehicle during a braking maneuver, in which the front wheels get into brake slip and the steering system is being operated.

BACKGROUND INFORMATION

If the wheels of a motor vehicle block during braking, they are then only still able to transmit a slight braking torque to the road. In addition, the wheels lose their lateral guidance force, so that the vehicle is no longer steerable. Even in vehicles having an integrated ABS system, the front wheels require a certain time period (wheel standstill time) in order to start up again after the blocking. During this time, they are not able to transmit any lateral force onto the roadway. The duration of the wheel standstill time is therefore especially critical for travel safety.

For the illustration of the dynamic processes in a usual ABS system we refer below to FIG. 1. It shows a braking system known from the related art, which is designed for ABS regulation, having a brake pedal 3, a brake booster 2 and a main brake cylinder 1 for producing brake pressure at a wheel brake 4. The brake circuit shown also includes an inlet valve 7, a wheel brake 4, an outlet valve 8 and a return pump 6. When brake pedal 3 is operated, a corresponding pressure is built up in the brake circuit, which acts upon wheel brake 4 via inlet valve 7, that is open in the normal state. In this state, outlet valve 8 is normally closed.

During an ABS regulation, the braking pressure acting upon wheel brake 4 is modulated using inlet valve 7 and outlet valve 8, the hydraulic fluid being able to be buffered in a buffer storage unit 9. A return pump 6 then conveys the hydraulic fluid coming from wheel brake 4 back in the direction of main brake cylinder 1. Thereby, the typical vibration of the pedal is created at brake pedal 3.

The duration of the wheel standstill time after the blocking of a wheel depends essentially on how rapidly the braking pressure acting on wheel brake 4 can be reduced. The speed of the pressure reduction is determined above all by the opening cross section of outlet valve 8, the accommodation capability of buffer storage unit 9 and the conveying power of return pump 6. For cost reasons, buffer storage unit 9 and return pump 6 are designed to be only as big as is absolutely necessary, so that, above all, these two components are limiting for the pressure reduction.

FIGS. 2a and 2b show the curve over time of wheel speed v and brake pressure p at the front wheels, for a usual ABS system, in a driving situation in which the wheels get into brake slip almost simultaneously. Since the front wheels behave essentially the same, only one characteristic curve 12 is shown here for the wheel speeds. In the driving situation shown in this instance, the vehicle first moves straight ahead at a speed v of about 20 m/s (see characteristic curve 11). After approximately 0.4 s, a braking process is initiated, by which brake pressure p rises to a value of about 140 bar. On account of a transition to a lower coefficient of friction (e.g. because of ice, wet pavement) after ca. 1.2 s, the front wheels begin to block; wheel speeds 12 of the two front wheels drop toward 0 m/s, as may be seen in FIG. 2a. Wheel speed 11 changes only slightly, however, since the vehicle having the blocked wheels at a low coefficient of friction continues to skid straight ahead.

As soon as the wheel slip of the front wheels exceeds a certain threshold value, a pressure is automatically reduced at wheel brake 4 by the opening of outlet valve 8. During the first phase of the pressure reduction (see FIG. 2b as of approximately 1.3 s) brake pressure 14 drops off at a maximum gradient. In this phase, the opening cross section of outlet valve 8 is the limiting variable for the pressure reduction. The hydraulic fluid flowing out of wheel brake 4 is temporarily stored in buffer storage unit 9. At about 1.6 s, buffer storage unit 9 is completely full (arrow 15). As of this time, the dynamics of the pressure reduction are determined by the conveying power of return pump 6. As may be seen in FIG. 2b, as of time 1.6 s, the pressure reduction runs in a substantially flatter manner. Only at approximately 2.5 s is a wheel start pressure of about 3 bar reached, as of which the wheel begins to start up again. The time span between the blocking and the renewed starting up of the front wheels (wheel standstill time) is designated in this case by reference numeral 13, and amounts to slightly more than 1 s. During this time span, the vehicle almost cannot be steered.

SUMMARY OF THE INVENTION

It is therefore an object of the exemplary embodiments and/or exemplary methods of the present invention to shorten the wheel standstill time of the front wheels during an ABS regulation, and with that to increase the driving safety.

This object may be attained according to the exemplary embodiments and/or exemplary methods of the present invention by the features described herein. Further developments of the exemplary embodiments and/or exemplary methods of the present invention are the subject matter of the further descriptions herein.

According to the exemplary embodiments and/or exemplary methods of the present invention, the driving state of the vehicle is monitored with respect to a driving situation in which the wheel slip of the front wheels exceeds a specified threshold value, and in which a steering requirement of the driver or of an automatic assistance system are also present. When such a driving situation has been detected, according to the exemplary embodiments and/or exemplary methods of the present invention, the brake pressure is first reduced at a first front wheel and after that at a second front wheel on the other side of the vehicle, until the wheel start-up pressure is reached. In the time in which the brake pressure at the first front wheel is reduced, the brake pressure at the second front wheel may either be held constant or it may be reduced at a smaller gradient. In this way, the buffer storage unit named at the outset is filled essentially only with the hydraulic fluid from the first front wheel brake, and does not fill up so fast. Because of that, the first front wheel starts up substantially faster than at a simultaneous pressure reduction. Consequently, the first front wheel is able to take up lateral forces more quickly, whereby the vehicle becomes steerable again earlier.

In a driving situation in which both front wheels get into brake slip at the same time, the brake pressure may first be reduced at the outer front wheel and after that at the inner front wheel. This is above all based on the reason that the outer front wheel is able to absorb more lateral force, and thus the vehicle is able to be stabilized faster. In addition, the blocking inside front wheel generates a yaw torque in the direction of the driver's steering intention.

After the wheel start-up pressure is reached at one wheel, a normal ABS regulation may be carried out at this wheel, in a standard mode.

The pressure reduction, described above, at the front wheel may be carried out only in a driving situation in which the vehicle is being steered. In the case of straight-ahead travel, the brake pressure should furthermore be reduced about simultaneously at the two front wheels. In order to activate the method according to the present invention when cornering, one may specify a threshold value, e.g. 10 degrees or more, for the steering angle. When it is exceeded, the sequential pressure reduction according to the exemplary embodiments and/or exemplary methods of the present invention takes place.

The wheel slip of individual wheels may be measured, for example, with the aid of wheel rotational speed sensors. The sequential pressure reduction, according to the exemplary embodiments and/or exemplary methods of the present invention, at the wheel brakes of the front wheels may be controlled by a control unit in which an appropriate algorithm is stored.

In the following, the exemplary embodiments and/or exemplary methods of the present invention are explained in greater detail by way of example, with reference to the attached drawings.

DETAILED DESCRIPTION

Figure 1:
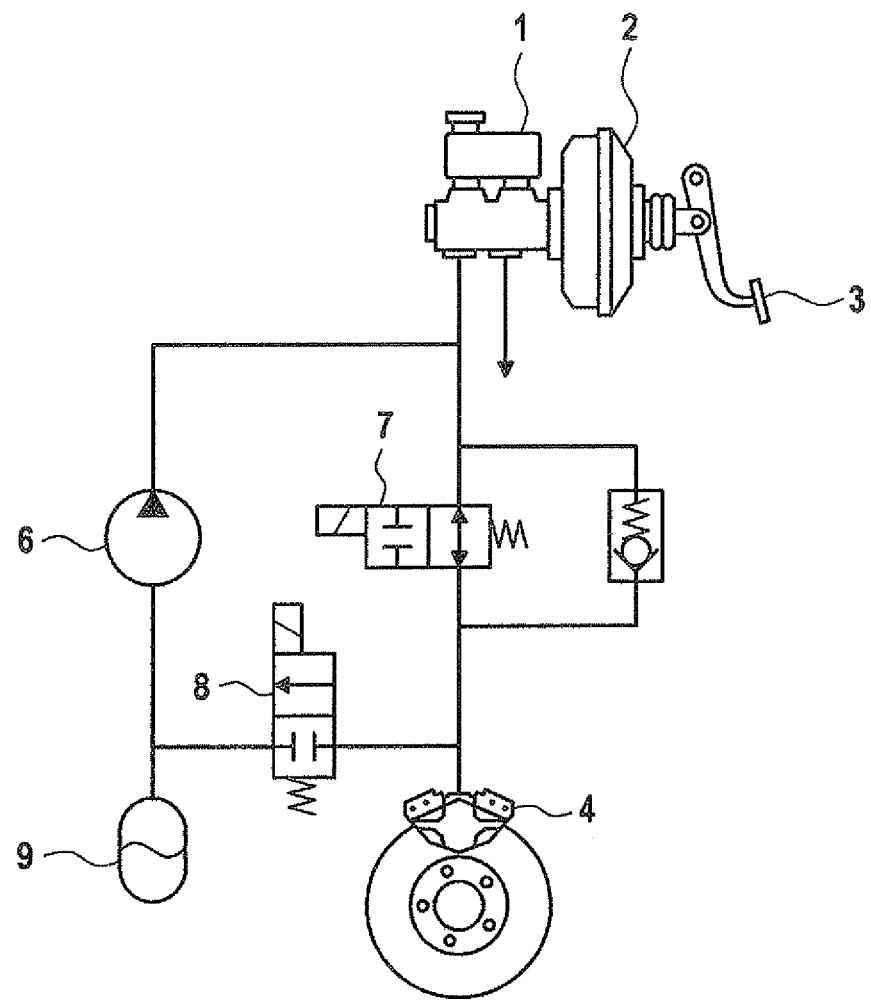
FIG. 1 shows the configuration of a usual braking system that is configured for an ABS regulation.
Figure 2A:
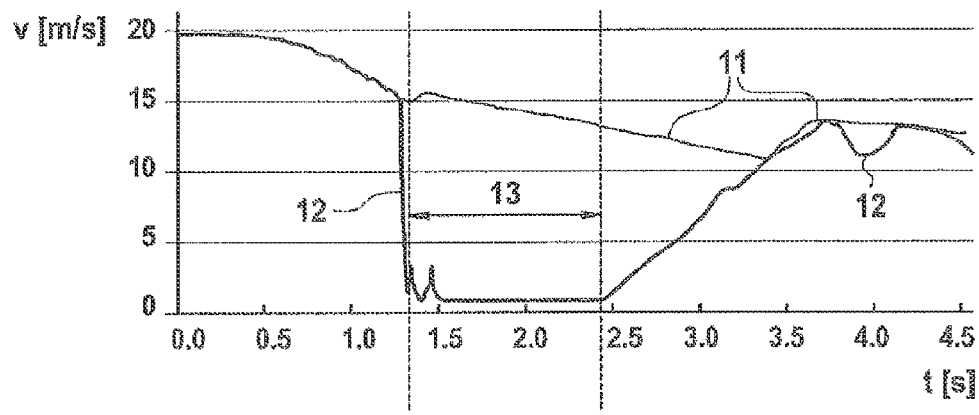
FIGS. 2a and 2b show the curve over time of the vehicle speed and the wheel speeds of the two front wheels, as well as the brake pressure acting at the front wheel brakes.
Figure 2B:
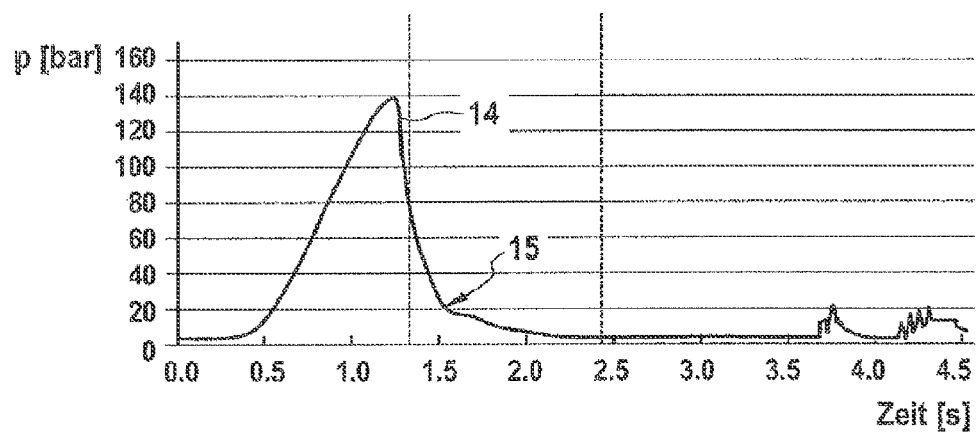

Reference is made to the introductory part of the specification regarding the clarification of FIGS. 1 and 2a, 2b.

Figure 3A:
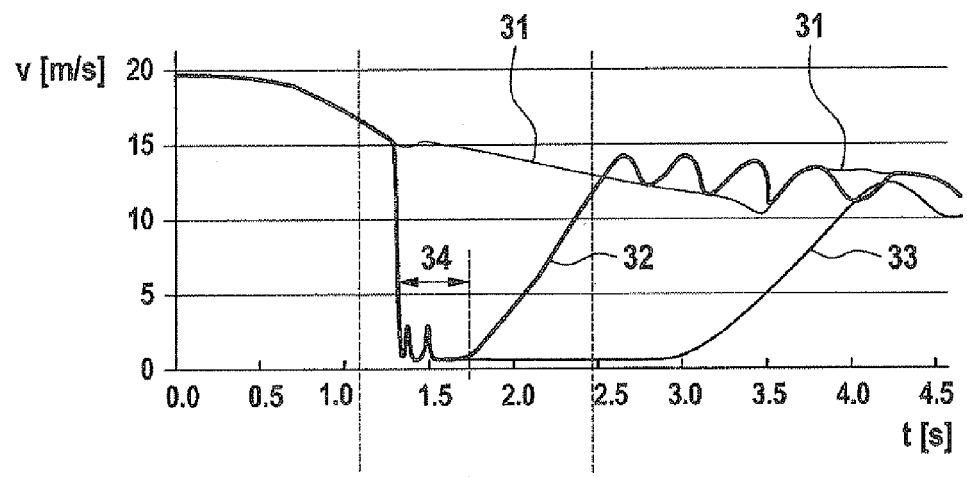
FIGS. 3a and 3b show the curve over time of the variables shown in FIGS. 2a and 2b in a driving situation in which the driver is steering and braking at the same time.
Figure 3B:
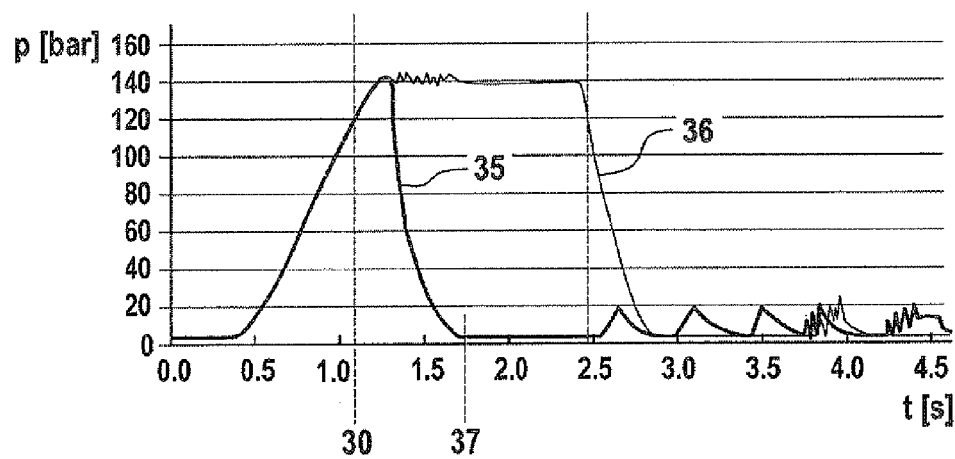

FIG. 3a shows the curve over time of vehicle speed 31 and the speed of the two front wheels 32 and 33 in a driving situation in which the vehicle is steered and braked at the same time. FIG. 3b shows the associated curve of brake pressure at the front wheels (characteristic curves 35 and 36).

The vehicle is first traveling straight ahead at a speed of about 20 m/s. At about 0.4 s, the driver operates the brake, which makes brake pressure p rise at the wheel brakes of the two front wheels. At about 1.1 s, the driver steers the vehicle to the left (line 30). After that, the brake pressure rises to the extent that the wheel slip of both front wheels exceeds a specified threshold value. Because of an automatic intervention of the ABS regulation, the brake pressure is first reduced at the outer (right) front wheel (characteristic curve 35). The brake pressure at the inner (left) front wheel remains essentially constant (characteristic curve 36) during this time. Therefore, hydraulic fluid flows only from the right wheel brake 4 into buffer storage unit 9, which is why buffer storage unit 9 does not fill up so quickly. The brake pressure at the right front wheel (characteristic curve 35) is thereby able to be reduced substantially faster than in FIG. 2, until the wheel start-up pressure is reached. Therefore, the right front wheel starts up again (reference numeral 37) already as of time 1.7 s, and is able to take up lateral forces again. Wheel standstill time 34, in which both front wheels block, thus amounts to only about 0.3 s.

The brake pressure at the inner (left) front wheel is also reduced, after a specified time, until the wheel start-up pressure is reached. The pressure reduction at the inner front wheel may begin, for example, at a time at which the outer (right) front wheel has approximately reached vehicle speed v.

After the wheel start-up speed is reached, a usual ABS regulation is carried out at both front wheel brakes, in which the brake pressure is modulated.

Figure 4A:
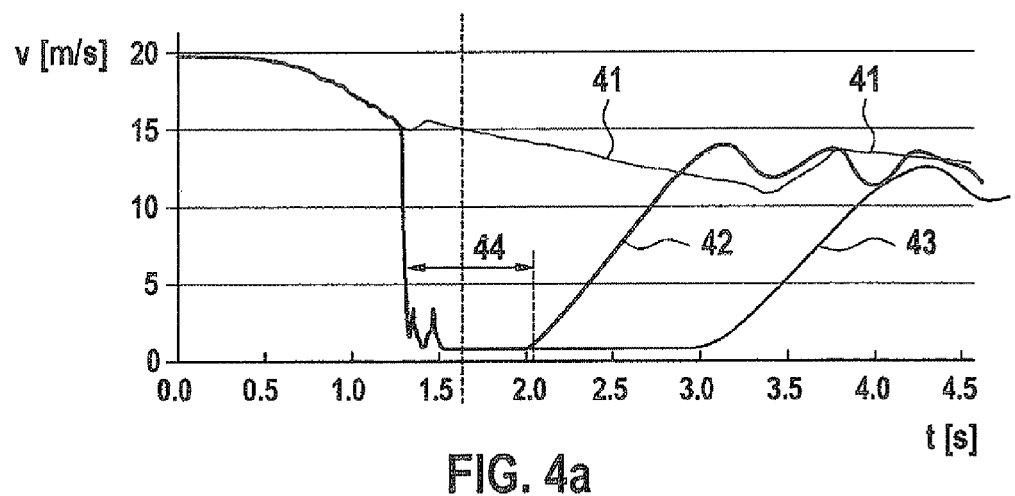
FIGS. 4a and 4b show the curve over time of the variables shown in FIGS. 2a and 2b, in a driving situation in which the driver first brakes in straight-ahead travel and only begins to steer when the front wheels are already blocking.
Figure 4B:
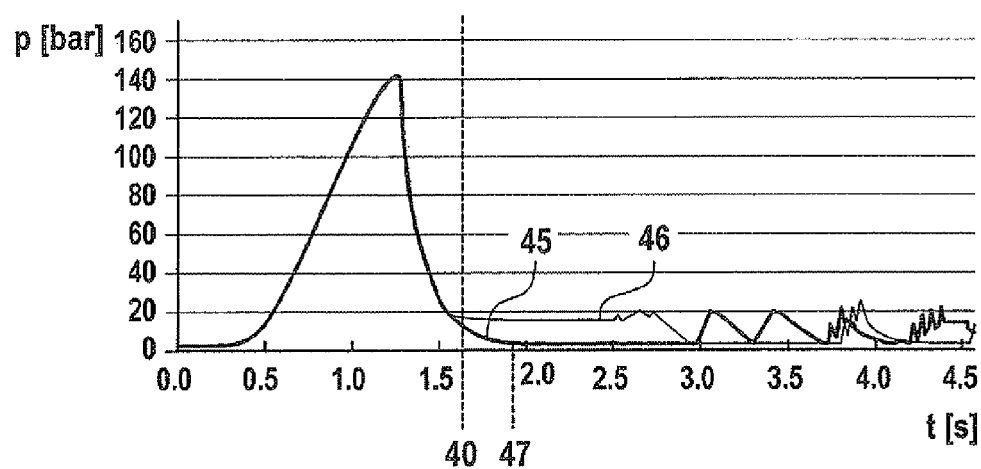

FIGS. 4a and 4b show the curve over time of the same physical variables shown in FIGS. 3a and 3b, however, in a driving situation in which the driver first brakes in straight-ahead travel and only begins to steer when the front wheels are already blocking.

In the example shown, the driver, as in FIGS. 3a, 3b, first operates the brake pedal, whereby the brake pressure increases at the front wheels (see characteristic curves 45 and 46). At approximately 1.4 s, the front wheels get into slip, whereby the ABS regulation is triggered and the brake pressure is reduced at both front wheels simultaneously. At approximately 1.6 s (dashed line 40) the driver begins to steer. As soon as the steering motion has been detected by the system, the pressure reduction at the wheel brake of the inner front wheel is stopped (characteristic curve 46). Therefore, return pump 6 has only still to convey the hydraulic fluid of the right front wheel brake back in the direction of main brake cylinder 1. Because of that, the pressure prevailing at the right front wheel brake (see characteristic curve 45) is able to be reduced more quickly.

In this case too, wheel standstill time 44 is substantially shorter than in a simultaneous pressure reduction according to the related art, as shown in FIGS. 2a and 2b. The wheel start-up pressure of the right front wheel is reached at approximately 2.0 s (reference numeral 47). As soon as the wheel speed of the right front wheel (characteristic curve 42) has reached vehicle speed v, the brake pressure at the left front wheel brake is also reduced until the wheel start-up pressure is reached (characteristic curve 46). After that, a usual ABS regulation takes place at both front wheels.

What is claimed is:

1. A method for stabilizing a vehicle during a braking maneuver, the method comprising:
    monitoring a driving state to detect a driving situation in which the wheel slip of both of the front wheels is greater than the same specified threshold value, and besides that, a steering requirement is present; and
    at a control unit of an ABS system, reducing, if such a driving situation has been detected, the brake pressure first at a first front wheel and after that at a second front wheel on the other side of the vehicle, until a wheel start-up pressure is reached.

2. The method of claim 1, wherein during the time span in which the brake pressure at the first front wheel is reduced, the brake pressure prevailing at the second front wheel is held constant or is reduced at a smaller gradient.

3. The method of claim 1, wherein at first the brake pressure prevailing at the outer front wheel and after that, the brake pressure prevailing at the inner front wheel is reduced.

4. The method of claim 1, wherein the brake pressure prevailing at the first front wheel is reduced by opening an associated outlet valve.

5. The method of claim 1, wherein the brake pressure prevailing at the second front wheel is held constant or is reduced at a slight gradient by the complete closing or the partial opening of an associated outlet valve.

6. The method of claim 1, wherein after a wheel start-up pressure is reached at one wheel, the normal ABS regulation is carried out for this wheel.

7. The method of claim 1, wherein it is checked whether the steering angle is exceeding a specified threshold value, and the sequential pressure reduction is carried out only for the case in which the steering angle exceeds the specified threshold value.

8. The method of claim 1, wherein the wheel start-up pressure is a pressure at which the first front wheel starts up after having been blocked.

9. A control unit for stabilizing a vehicle during a braking maneuver, comprising:
- a monitoring arrangement to monitor a driving state to detect a driving situation in which the wheel slip of both of the front wheels is greater than the same specified threshold value, and besides that, a steering requirement is present; and
- a reducing arrangement to reduce, if such a driving situation has been detected, the brake pressure first at a first front wheel and after that at a second front wheel on the other side of the vehicle, until a wheel start-up pressure is reached.

* * * * *